(12) United States Patent
Nagasaka

(10) Patent No.: US 7,967,093 B2
(45) Date of Patent: Jun. 28, 2011

(54) HIGH-VOLTAGE BATTERY UNIT MOUNTING STRUCTURE FOR VEHICLE

(75) Inventor: Satoshi Nagasaka, Hamamatsu (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/239,147

(22) Filed: Sep. 26, 2008

(65) Prior Publication Data

US 2009/0090575 A1  Apr. 9, 2009

Related U.S. Application Data

(63) Continuation of application No. 11/722,645, filed as application No. PCT/JP2005/021462 on Nov. 22, 2005, now abandoned.

(30) Foreign Application Priority Data

Dec. 24, 2004  (JP) .................................. 2004-374519

(51) Int. Cl.
*B60R 16/04* (2006.01)
(52) U.S. Cl. ...................................... 180/68.5; 180/68.4
(58) Field of Classification Search .................. 180/68.1, 180/68.2, 68.5, 68.4, 65.1, 65.31, 68.3; 62/186, 62/244, 259.2; 429/99, 407
See application file for complete search history.

(56) References Cited

U.S. PATENT DOCUMENTS

| | | | | |
|---|---|---|---|---|
| 5,354,625 A * | 10/1994 | Bentz et al. | ...................... | 429/407 |
| 5,390,754 A * | 2/1995 | Masuyama et al. | ........... | 180/68.5 |
| 5,392,873 A * | 2/1995 | Masuyama et al. | ........... | 180/68.5 |
| 5,490,572 A * | 2/1996 | Tajiri et al. | .................... | 180/65.1 |
| 5,558,949 A * | 9/1996 | Iwatsuki et al. | ................ | 429/99 |
| 6,204,769 B1 * | 3/2001 | Arai et al. | ..................... | 180/65.1 |
| 6,220,383 B1 * | 4/2001 | Muraki et al. | ............... | 180/68.5 |
| 6,569,556 B2 * | 5/2003 | Zhou et al. | ....................... | 429/88 |
| 6,978,855 B2 * | 12/2005 | Kubota et al. | ................ | 180/68.2 |
| 7,051,825 B2 * | 5/2006 | Masui et al. | ................. | 180/68.5 |
| 7,079,379 B2 * | 7/2006 | Yamaguchi et al. | ......... | 180/68.5 |
| 7,198,124 B2 * | 4/2007 | Amori et al. | ................. | 180/68.5 |
| 7,240,752 B2 * | 7/2007 | Takahashi et al. | ........... | 180/68.1 |
| 7,374,001 B2 * | 5/2008 | Uozumi et al. | ............ | 180/65.31 |
| 7,451,608 B2 * | 11/2008 | Kikuchi | ........................... | 62/186 |
| 2001/0030069 A1 | 10/2001 | Misu et al. | | |
| 2003/0168844 A1 | 9/2003 | Borroni-Bird et al. | | |

FOREIGN PATENT DOCUMENTS

| | | |
|---|---|---|
| EP | 1 115 165 A2 | 7/2001 |
| JP | 2001-102099 A | 4/2001 |
| JP | 2001-130468 A | 5/2001 |
| JP | 2002-166728 A | 6/2002 |
| JP | 2002-186101 A | 6/2002 |
| JP | 2002-231321 A | 8/2002 |

\* cited by examiner

*Primary Examiner* — Hau V Phan
(74) *Attorney, Agent, or Firm* — Foley & Lardner LLP

(57) ABSTRACT

To make even a high-voltage battery with an extraordinarily large capacity, mountable on a vehicle, a high-voltage battery is installed on a rear floor panel in a rear portion of a fuel cell electric vehicle, and a cooling fan unit for cooling the battery is connected to the high-voltage battery by an exhaust duct. In addition, the cooling fan unit is disposed on a rear side member, in the vicinity, at the vehicle-rear side, of the high voltage battery, and on the same horizontal plane that the high-voltage battery is located on. At the vehicle-rear side of the high-voltage battery, a utility box is provided. An exhaust duct connected to the cooling fan unit is disposed between the utility box and a utility box adjacent thereto.

12 Claims, 7 Drawing Sheets

HIGH-VOLTAGE BATTERY UNIT MOUNTING STRUCTURE FOR VEHICLE

CROSS-REFERENCE TO RELATED PATENT APPLICATIONS

This application is a Continuation of U.S. application Ser. No. 11/722,645, filed Jun. 22, 2007, which is the National Stage of International Application No. PCT/JP2005/021462, filed Nov. 22, 2005, which is based upon and claims the benefit of priority from prior Japanese Patent Application No. 2004-374519, filed Dec. 24, 2004, the entire contents of all of which are incorporated herein by reference.

TECHNICAL FIELD

The present invention relates to a high-voltage battery unit mounting structure for vehicle, in which a high-voltage battery and a cooling fan motor thereof are arranged in a lower portion of a vehicle.

BACKGROUND ART

A high-voltage battery mounted on an electric vehicle is arranged on a floor panel under a rear seat, for example, as described in the following Patent Document 1, and a cooling fan motor for cooling the high-voltage battery that generates heat and the high-voltage battery are arranged side by side along a vehicle-width direction.

Patent Document 1: Japanese Patent Application Laid-Open Publication No. 2002-166728

DISCLOSURE OF THE INVENTION

Problems to be Solved by the Invention

However, when the high-voltage battery is arranged so as to be arrayed along the vehicle-width direction under the rear seat, the longer dimension of the battery is aligned in the vehicle-width direction, and spaces located sideward thereof, for example, spaces between the high-voltage battery and wheel houses, cannot be utilized effectively. On the other hand, when the spaces are to be utilized effectively, there is a problem in that it becomes difficult to mount a high-voltage battery with an extraordinarily large capacity on the vehicle.

In this connection, an object of the present invention is to make the spaces of portions at the vehicle-side of the high-voltage batteries available for effective use even in the case of mounting a high-voltage batteries with a extraordinarily large capacity, on the vehicle.

Means for Solving the Problems

The principal characteristics of the present invention are the mounting of a high-voltage battery in a lower portion of a vehicle, and the disposing a cooling fan motor for cooling the high-voltage battery in the vicinity, at the vehicle-rear side, of the battery as well as on the same horizontal plane that the high-voltage battery is located on.

Effects of the Invention

According to the present invention, the disposition of the cooling fan motor in the vicinity, at the vehicle-rear side, of the high-voltage battery and on the same horizontal plane that the high-voltage battery is located on leaves spaces of portions at the vehicle-side of the high-voltage batteries. Even in the case of mounting a high-voltage battery with an extraordinarily large capacity, the spaces of portions at the vehicle-side of the high-voltage battery can be utilized effectively.

Moreover, the disposition of the cooling fan motor in the vicinity, at the vehicle-rear side, of the high-voltage battery, the distance between the high-voltage battery and the cooling fan motor for cooling the battery becomes shorter, and cooling efficiency can be enhanced.

Furthermore, the disposition of the cooling fan motor at the vehicle-rear side of the high-voltage battery prevents the contact of the cooling fan motor with the high-voltage battery, particularly at the time of a collision from a side of the vehicle. As a result, a damage of the high-voltage battery as a high-voltage electrical component can be prevented at the time of the collision.

Moreover, the disposition of the cooing fan motor on the same plane that the high-voltage battery is located on allows the cooling fan motor, together with the high-voltage battery, to be housed under the luggage board and on the floor panel. As a result, the luggage space can be utilized effectively.

BEST MODE FOR CARRYING OUT THE INVENTION

A description will be made below of embodiments of the present invention with reference to the drawings.

Figure 1:
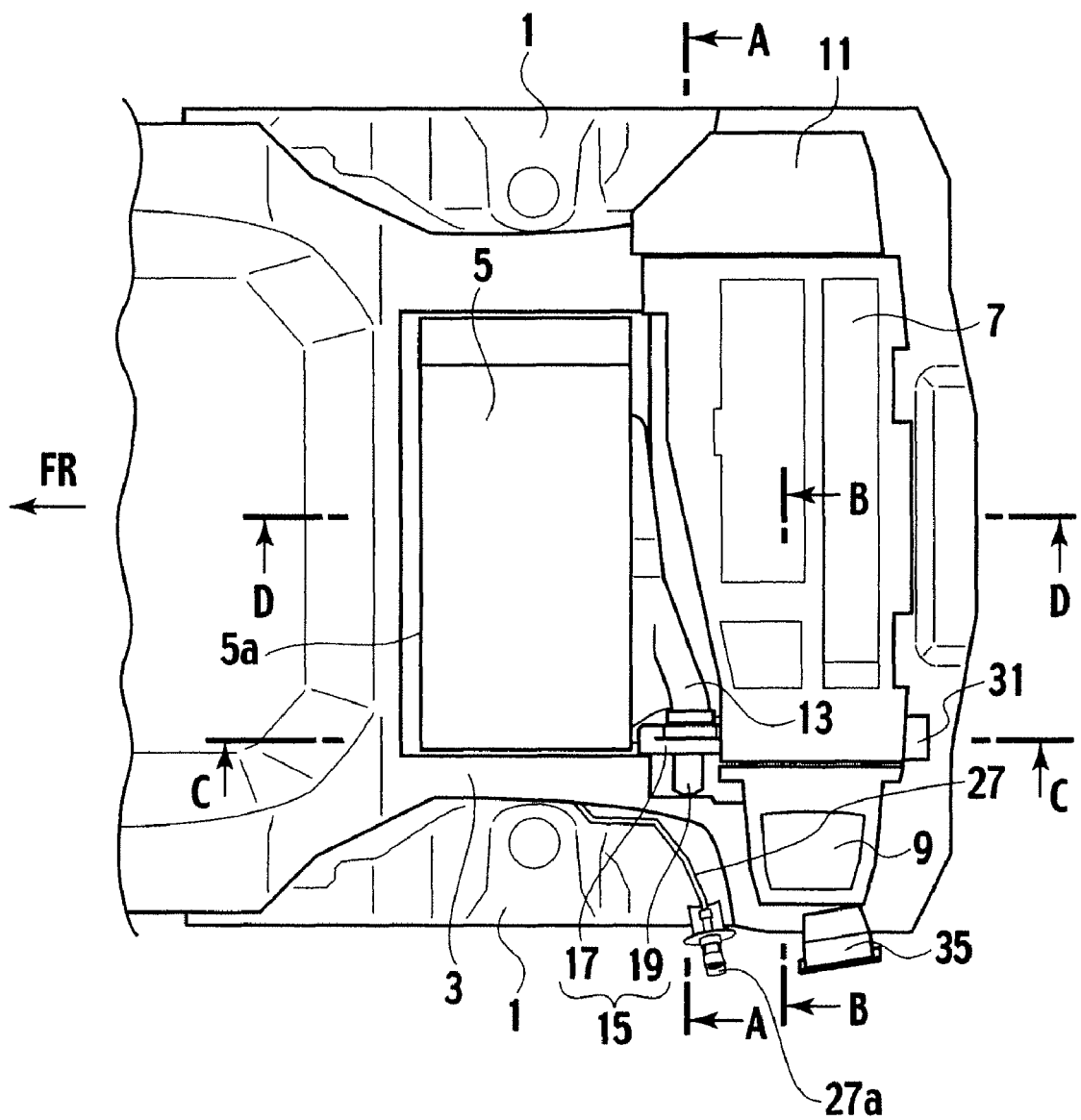
FIG. 1 is a plan view of a vehicle-rear portion, showing a high-voltage battery unit mounting structure for vehicle according to a first embodiment of the present invention.

FIG. 1 is a plan view of a vehicle rear portion, showing a high-voltage battery unit mounting structure for vehicle according to a first embodiment of the present invention. In FIG. 1, an arrow FR denotes the vehicle front direction. The vehicle is a fuel cell electric vehicle that mounts an unillustrated fuel cell thereon, with a high-voltage battery 5 disposed on a rear floor panel 3 between a left and right pair of wheel houses 1 in a vehicle rear portion.

In a cargo room, a utility box 7, as an article storage box, is installed at the vehicle-rear side of the high-voltage battery 5. Moreover, at both sides of the utility box 7 in a vehicle width direction, utility boxes 9 and 11 as article storage boxes are individually installed.

The high-voltage battery 5 is housed in a battery case. An exhaust duct 13 that discharges the air in the case to the outside is connected to the vehicle-rear side of the high-voltage battery 5. The downstream end of the exhaust duct 13 is connected to a cooing fan unit 15 for cooling the high-voltage battery 5. In a vehicle front-end portion of the battery case, an intake port 5a for introducing the air into the battery case is provided.

The cooing fan unit 15 includes a cooling fan 17, and a cooling fan motor 19 for rotating the cooling fan 17. The cooing fan unit 15 is disposed in a gap between the high-voltage battery 5 and a utility box A7 located in the vicinity, at the vehicle-rear side, of the high-voltage battery 5 and on the same horizontal plane that the high-voltage battery 5 is located on.

The high-voltage battery 5 and the cooling fan unit 15, both described above, compose the high-voltage battery unit.

Figure 2:
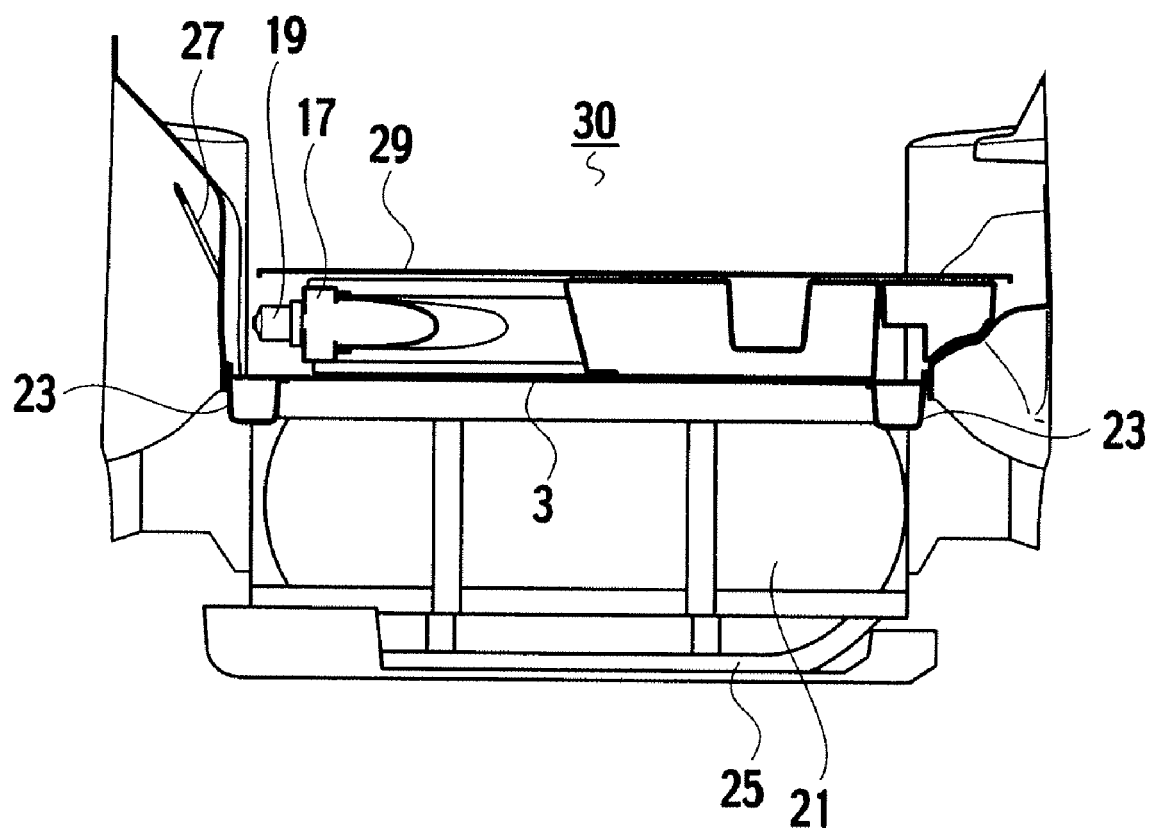
FIG. 2 is a cross-sectional view taken along the line A-A of FIG. 1.

FIG. 2 is a cross-sectional view taken along the line A-A of FIG. 1, The vertical direction in FIG. 2 is a vehicle-height direction. Under a floor panel at the vehicle-front side of the high-voltage battery 5, a hydrogen tank 21 that stores hydrogen supplied as fuel to the unillustrated fuel cell is installed. The hydrogen tank 21 is fixed to a vehicle body with a tank holding member 25 attached to a vehicle-body frame member such as rear side members 23, which extend in a vehicle fore-and-aft direction at both sides in the vehicle-width direction (both sides in a crosswise direction in FIG. 2).

The cooling fan motor 19 is fixed to the rear floor panel 3, at a position on one of the above-described rear side member 23 and on an outer side than the high-voltage battery 5 in the vehicle-width direction. At a still outer side position of the cooling fan motor 19 in the vehicle-width direction and between the cooling fan motor 19 and the wheel house 1, a hydrogen filler pipe 27 as a hydrogen pipe extends in the vehicle fore-and-aft direction. The hydrogen filler pipe 27 is a route for filling the hydrogen supplied through a filler port 27a shown in FIG. 1 into the hydrogen tank 21. As shown in FIG. 2, when viewed from the vehicle fore-and-aft direction, the position in the vehicle-height direction of the hydrogen filler pipe 27 is shifted from the position of the cooling fan motor 19 to place the hydrogen filler pipe 27 at a higher position than the cooling fan motor 19.

Note that, a luggage board 29, which covers the utility box 7, the utility box 9, and the utility box 11 in FIG. 2, is omitted in FIG. 1. The space on the luggage board 29 becomes a luggage space, that is, a cargo room 30 as a vehicle compartment.

Figure 3:
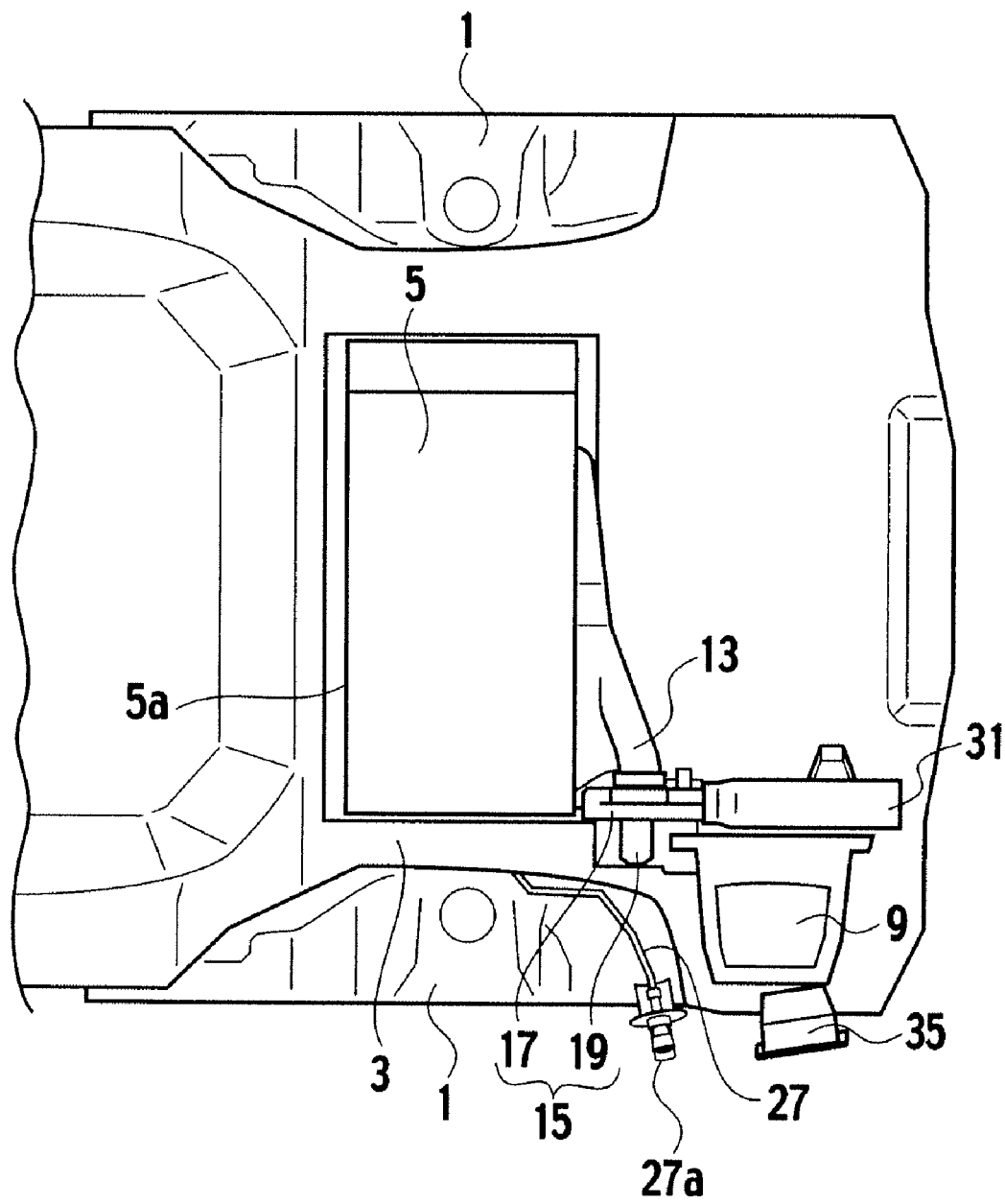
FIG. 3 is a plan view showing a state where a luggage board and utility boxes are detached from the vehicle-rear portion shown in FIG. 1.

FIG. 3 is a plan view showing a state where the luggage board 29, the utility box 7, and the utility box 11 are detached from the vehicle rear portion shown in FIG. 1. An exhaust duct 31 is connected to a vehicle-rear side portion of the cooling fan unit 15 and receives, from the cooling fan motor 19, the exhaust air containing heat generated from the high-voltage battery 5. The exhaust air is allowed to flow through the exhaust duct 31.

Figure 4:
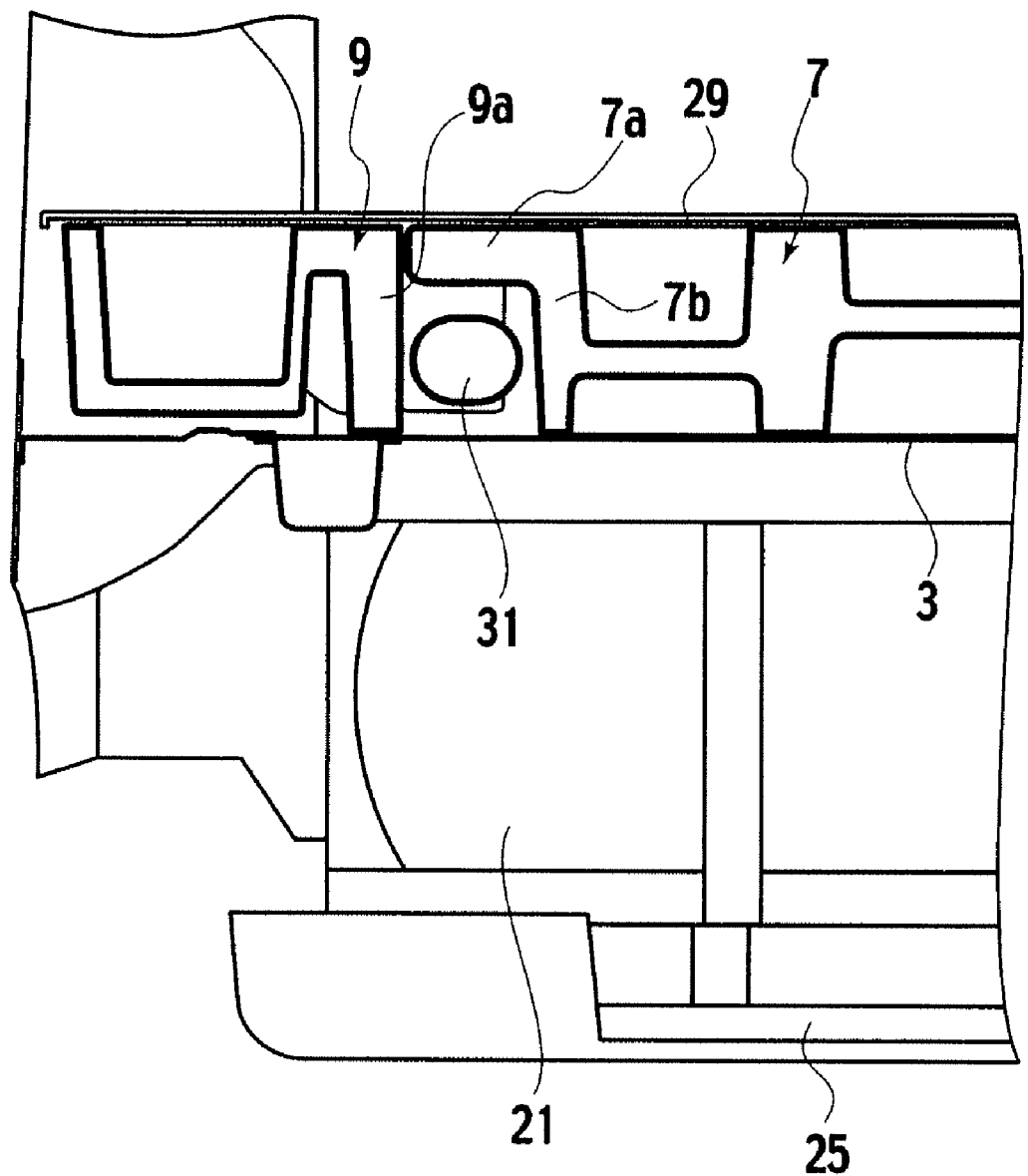
FIG. 4 is a cross-sectional view taken along the line B-B of FIG. 1.

FIG. 4 is a cross-sectional view taken along the line B-B of FIG. 1. The vertical direction in FIG. 4 is the vehicle-height direction. This figure shows that the exhaust duct 31 is disposed in a parting portion between the utility box 7 and the utility box 9.

Moreover, the following walls surround the above-described exhaust duct 31: an end-portion upper wall 7a and an end-portion sidewall 7b of the utility box 7 as well as an end-portion sidewall 9a of the utility box 9. The end-portion sidewall 7b extends downward from a right-end portion, in the vehicle-width direction, of the end-portion upper wall 7a until the lower end of the sidewall 7b reaches the rear floor panel 3. The end-portion sidewall 9a is located on the right-hand side of the utility box 9 in the vehicle-width direction.

Figure 5:
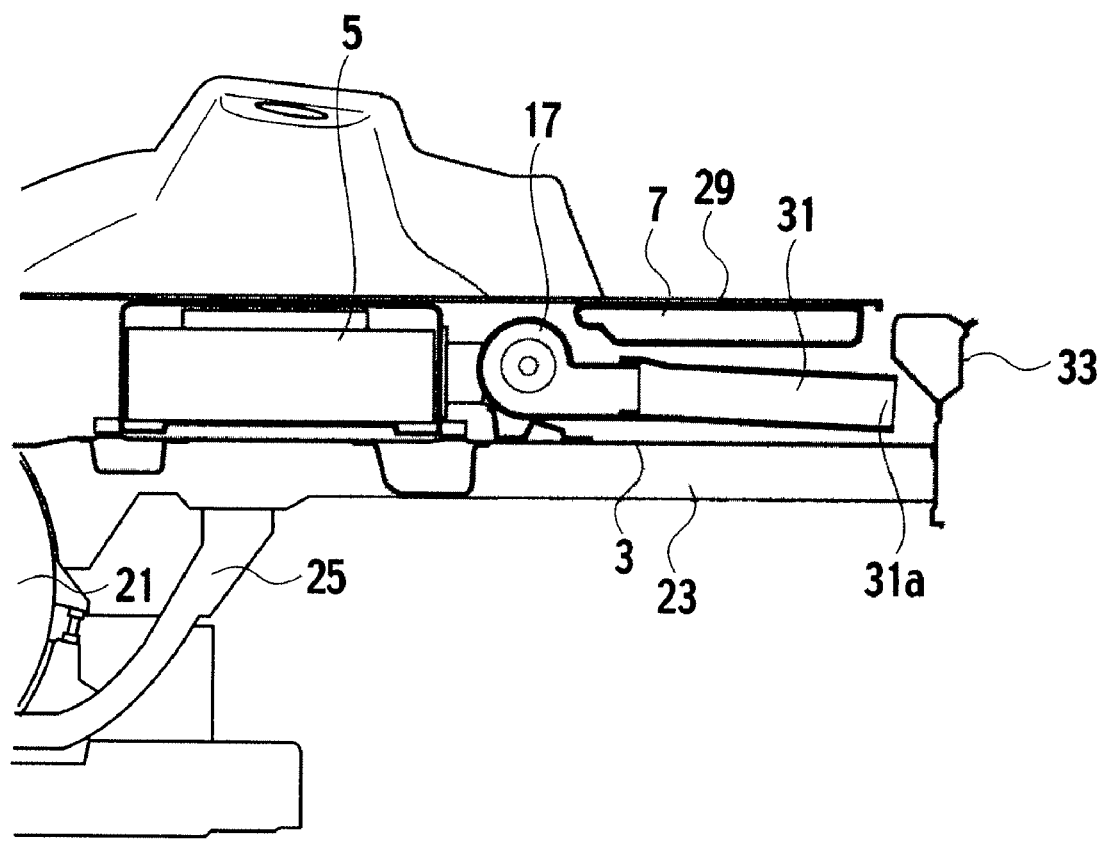
FIG. 5 is a cross-sectional view taken long the line C-C of FIG. 1.

FIG. 5 is a cross-sectional view taken along the line C-C of FIG. 1. A discharge port 31a of the above-described exhaust duct 31 is placed in the vicinity of a vehicle-body rear panel 33 in the periphery of the rear-end portion of the vehicle.

Figure 6:
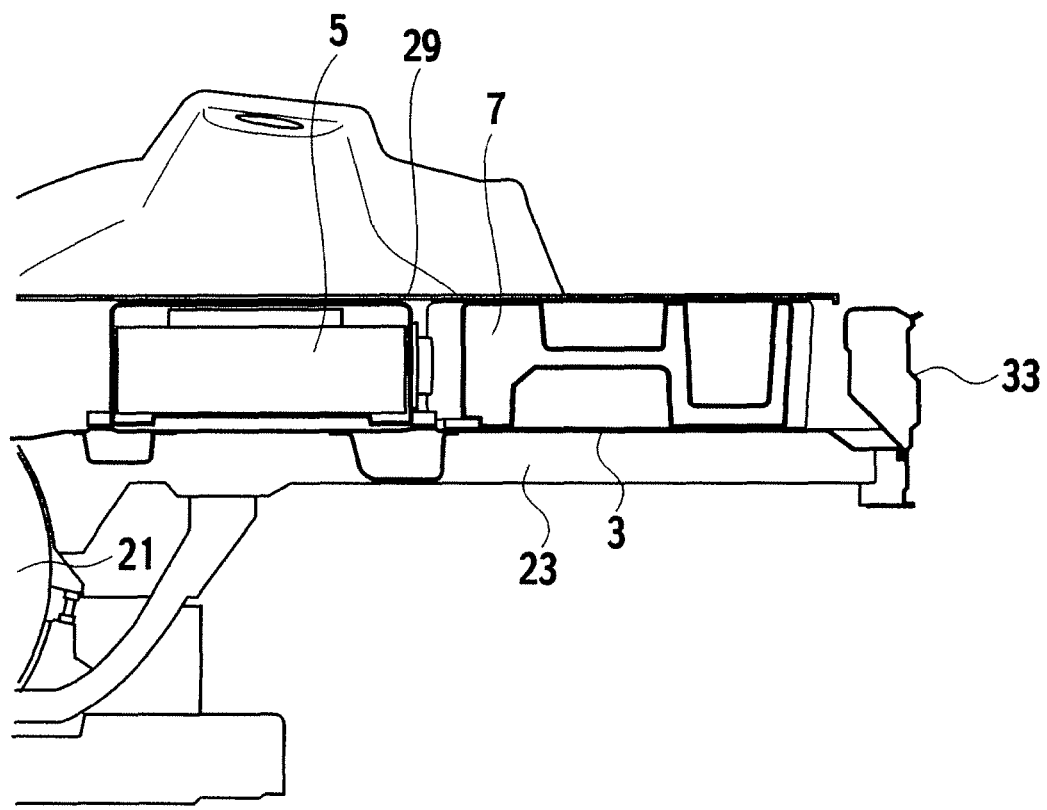
FIG. 6 is a cross-sectional view taken along the line D-D of FIG. 1.

FIG. 6 is a cross-sectional view taken along the line D-D of FIG. 1. As apparent from FIG. 6 and FIG. 4 described above, the respective lower end portions of the utility box 7, the utility box 9, and the utility box 11 are arranged to be brought into close contact with the upper surface of the floor panel 3.

Next, a description will be made of advantageous effects.

The cooling fan motor 19 is disposed in the vicinity, at the vehicle-rear side, of the high-voltage battery 5 and on the same horizontal plane that the high-voltage battery 5 is located on. Accordingly, spaces are left between the high-voltage battery 5 and the wheel houses 1, each of which is located on a side of the vehicle. Even in the case of mounting the high-voltage battery 5 with an extraordinarily large capacity, the space between the high-voltage battery 5 and each wheel house 1 on a side of the vehicle can be effectively utilized, for example, for the purpose of cabling electric wires.

Moreover, the cooling fan motor 19 is disposed in the vicinity, at the vehicle-rear side, of the high-voltage battery 5. The disposition renders the distance between the high-voltage battery 5 and the cooling fan motor 19 for cooling shorter, and enhances the cooling efficiency.

Furthermore, the cooling fan motor 19 is disposed at an outer side than the high-voltage battery 5 in the vehicle-width direction. The disposition prevents the contact of the cooling fan motor 19 with the high-voltage battery 5, particularly, at the time of a collision from the rear of the vehicle, and prevents a damage of the high-voltage battery 19 as a high-voltage electrical part at the time of the collision. Moreover, the cooling fan motor 19 is disposed at the vehicle-rear side of the high-voltage battery 5 in the vehicle fore-and-aft direction. The disposition prevents the contact of the cooling fan motor 19 with the high-voltage battery 5 particularly at the time of a collision from a side of the vehicle, and prevents a damage of the high-voltage battery 5, which is a high-voltage electrical component, at the time of the collision.

Moreover, the cooing fan motor 19 is disposed on the same plane that the high-voltage battery 5 is located on. The disposition allows the cooling fan motor 19, together with the high-voltage battery 5, to be housed under the luggage board 29 and on the rear floor panel 3, so that the luggage space (cargo room 30) can be utilized effectively.

Furthermore, as shown in FIG. 2, the position, in the vehicle-height direction, of the hydrogen filler pipe 27 is shifted from that of the cooling fan motor 19 when viewed from the vehicle fore-and-aft direction. This arrangement prevents the hydrogen filler pipe 27 from being pressed between the cooling fan motor 19 and a tire (not shown) in the wheel house at the time, particularly, of a collision from a side of the vehicle. Accordingly, no additional reinforcement dedicated to the prevention of such a pressed-in-between state.

Moreover, as shown in FIG. 2, the cooling fan motor 19 is disposed on the rear side member 23 as the vehicle-body frame member located in a lower portion of the vehicle body. The disposition prevents the shift of the cooling fan motor 19 in the vehicle-width direction particularly at the time of a collision from a side of the vehicle, as the above-described disposition.

As shown in FIG. 4, the exhaust duct 31 is disposed in the parting portion that might otherwise become a dead space between the plurality of utility boxes 7 and 9 provided in the vehicle compartment (cargo room 30). The disposition allows effective utilization of the space of the cargo room 30, renders the utility boxes 7 and 9 larger in volume, and extends the cargo-room space available for use by the user to the maximum.

Moreover, as shown in FIG. 4, the exhaust duct 31, which is the air-discharging route from the cooling fan motor 19 as a generation source of sounds and vibrations, is covered with the utility boxes 7 and 9 made of a foamed material with a sound absorbing effect. Accordingly, the sound and vibration performance can be enhanced. Moreover, the utility boxes 7 and 9, which serve also as sound insulating members (sound absorbing members), contribute to a reduction in weight and cost as compared with the case of separately providing other sound insulating members.

As shown in FIG. 5, the discharge port 31a of the exhaust duct 31, which is the portion from which the sounds and the vibrations are discharged, is placed in the vicinity of the rear-end portion of the vehicle. The arrangement leaves an enough distance of the discharge port 31a from a passenger positioned in front, in the vehicle fore-and-aft direction, of discharge port 31 to enhance the sound and vibration performance. Moreover, the arrangement leaves an enough distance from the cooling fan motor 19 as the generation source of the sounds and the vibrations to the discharge port 31a to attenuate the sounds effectively in the exhaust duct 31. As a result, the sound and vibration performance is enhanced.

As shown in FIG. 4 and FIG. 6, the utility boxes 7 and 9 are brought into close contact with the upper surface of the rear floor panel 3. Accordingly, while the exhaust duct 31 warms the air therearound, the flowing back of the air thus warmed to the side of the high-voltage battery 5 is prevented, which results in an enhanced cooling efficiency for the high-voltage battery 5.

Figure 7:
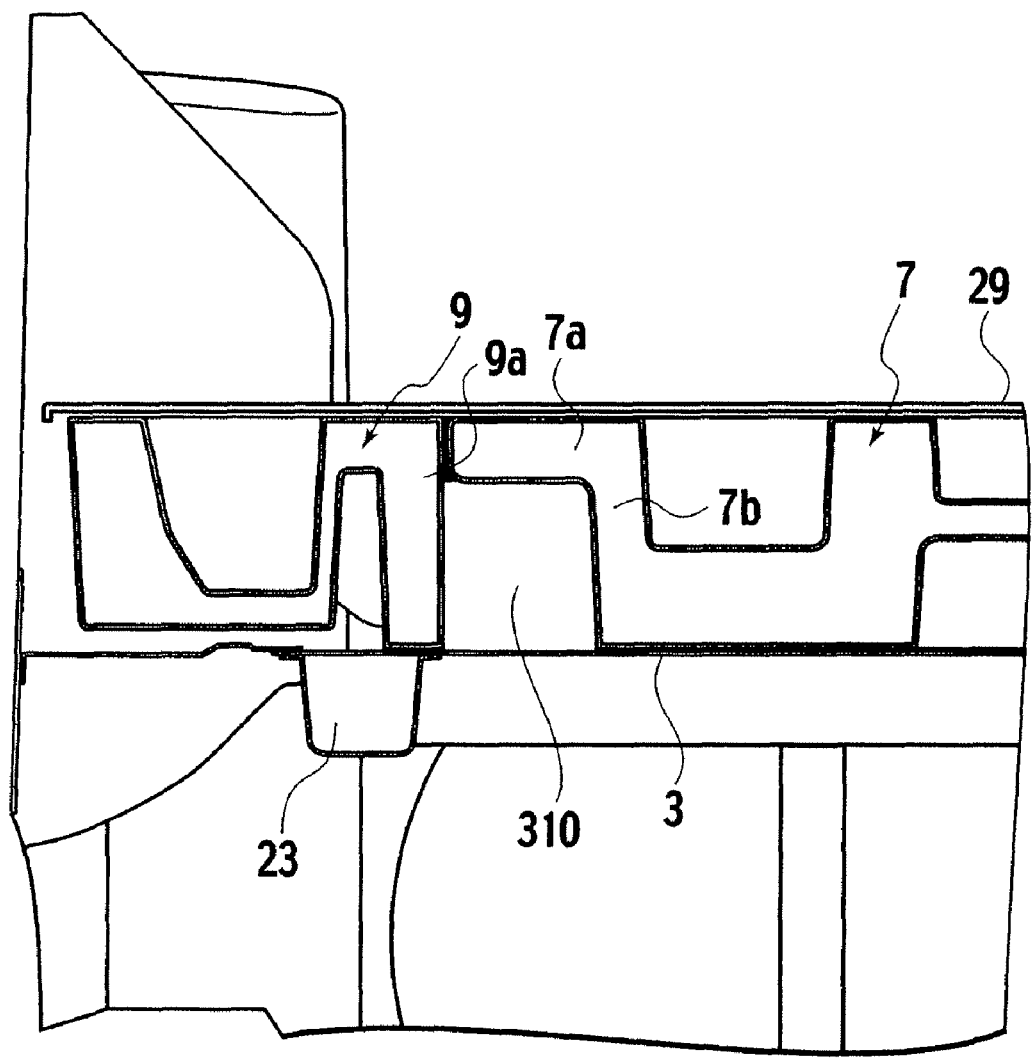
FIG. 7 is a cross-sectional view showing a second embodiment of the present invention and corresponding to FIG. 4.

FIG. 7 is a cross-sectional view showing a second embodiment of the present invention and corresponding to FIG. 4. In the second embodiment, an exhaust duct 310 replaces the exhaust duct 31 in the first embodiment shown in FIG. 4.

The exhaust duct 310 is composed such that a region surrounded by the end-portion upper wall 7a of the utility box 7, the end-portion sidewall 7b of the utility box 7, the end-portion sidewall 9a of the utility box 9 and the rear floor panel 3 forms an exhaust passage. Hence, in this case, the space among outer walls of the plurality of article storage boxes provided in the vehicle compartment is configured to be the exhaust passage.

In the exhaust duct 310 with a configuration described above, the very inner-wall of the exhaust passage is composed of the utility boxes 7 and 9, which are made of the foamed material with a sound absorbing effect. This renders the sound and vibration performance enhanced. Moreover, the utility boxes 7 and 9 made to serve both as the sound insulating members and as the exhaust duct contribute to a reduction in the weight and the cost as compared with the case of separately providing sound insulating members and an exhaust duct dedicated for the respective purposes.

As a third embodiment of the present invention, as shown in FIG. 1, an exhaust port 35 is provided on the side of a rear portion of the vehicle. An unillustrated exhaust duct connects the exhaust port 35 and the cooling fan unit 15 to each other. The exhaust duct in this case is formed so as to be surrounded by two utility boxes provided separately like the exhaust duct 31 shown in FIG. 4. Alternatively, exhaust duct is formed by making the region surrounded by the two utility boxes provided separately and the rear floor panel 3 an exhaust passage, like the exhaust duct 310 shown in FIG. 7.

In this way, as in the above-described second embodiment, enhancement in the sound and vibration performance as well as the reduction in weight and cost can be achieved, as compared with the case of separately providing the dedicated sound insulating members and exhaust duct.

INDUSTRIAL APPLICABILITY

According to the present invention, the cooling fan motor is disposed in the vicinity of the high-voltage battery at the vehicle-rear side and on the same horizontal plane that the high-voltage battery is located on. The disposition leaves spaces in the regions at the sides, in the vehicle-width direction, of the battery. Even in the case of mounting the high-voltage battery with an extraordinarily large capacity, the spaces in the regions at the sides, in the vehicle-width direction, of the high-voltage battery can be utilized effectively.

Moreover, the cooling fan motor is disposed in the vicinity, at the vehicle-rear side, of the high-voltage battery. The disposition renders the distance between the high-voltage battery and the cooling fan motor for cooling shorter, and enhances the cooling efficiency.

Furthermore, the cooling fan motor is disposed at the vehicle-rear side of the high-voltage battery. The disposition prevents the contact of the cooling fan motor with the high-voltage battery particularly at the time of a collision from a side of the vehicle, and prevents a damage of the high-voltage battery, which is a high-voltage electrical component, at the time of the collision.

Moreover, the cooing fan motor is disposed on the same plane that the high-voltage battery is located on. The disposition allows the cooling fan motor, together with the high-voltage battery, to be housed under the luggage board and on the rear floor panel, so that the luggage space can be utilized effectively.

The invention claimed is:

1. A high-voltage battery unit mounting structure for a vehicle, wherein the vehicle has a vehicle front and a vehicle rear, and wherein a high-voltage battery is mounted in a lower portion of the vehicle between the front and the rear of the vehicle, and a cooling fan motor for cooling the high-voltage battery is disposed rearward from the entire high-voltage battery, adjacent to the rear of the vehicle and laterally to a side of the high-voltage battery, and on the same horizontal plane that the high-voltage battery is located on.

2. The high-voltage battery unit mounting structure for the vehicle according to claim 1, wherein the vehicle is a fuel cell electric vehicle that mounts a fuel cell thereon, wherein a hydrogen pipe for supplying the fuel cell extends in a vehicle fore-and-aft direction, and wherein positions of the hydrogen pipe and the cooling fan motor in a vehicle-height direction are shifted from each other when viewed from the vehicle fore-and-aft direction.

3. The high-voltage battery unit mounting structure for the vehicle according to claim 1, wherein the cooling fan motor is disposed on a vehicle-body frame member located in the lower portion of the vehicle.

4. The high-voltage battery unit mounting structure for the vehicle according to claim 1, wherein an exhaust duct which receives exhaust air containing heat generated from the high-voltage battery and through which the exhaust air is flown by the cooling fan motor is disposed in a parting portion between a plurality of article storage boxes provided in a vehicle compartment.

5. The high-voltage battery unit mounting structure for the vehicle according to claim 4, wherein the article storage boxes are brought into close contact with a vehicle body.

6. The high-voltage battery unit mounting structure for the vehicle according to claim 4, wherein the article storage boxes are brought into close contact with a rear floor panel.

7. The high-voltage battery unit mounting structure for the vehicle according to claim 1, wherein an exhaust duct which receives exhaust air containing heat generated from the high-voltage battery and through which the exhaust air is flown by the cooling fan motor is disposed so as to have a discharge port located in a vicinity of a rear-end portion of the vehicle.

8. The high-voltage battery unit mounting structure for the vehicle according to claim 1, wherein an exhaust duct which receives exhaust air containing heat generated from the high-voltage battery and through which the exhaust air is flown by the cooling fan motor is disposed so as to be surrounded by a plurality of article storage boxes provided in a vehicle compartment.

9. The high-voltage battery unit mounting structure for the vehicle according to claim 1, wherein an exhaust duct which receives exhaust air containing heat generated from the high-voltage battery and through which the exhaust air is flown by the cooling fan motor is disposed so as to make a space between outer walls of a plurality of article storage boxes provided in a vehicle compartment be an exhaust passage.

10. The high-voltage battery unit mounting structure for the vehicle according to claim 9, wherein the exhaust duct is connected to an exhaust port disposed on a side of a rear portion of the vehicle.

11. The high-voltage battery unit mounting structure for the vehicle according to claim 1, wherein the high-voltage battery and the cooling fan motor are arranged on a floor panel under a cargo room in a rear portion of the vehicle.

12. A high-voltage battery unit mounting structure for a vehicle, wherein a high-voltage battery is mounted in a lower portion of the vehicle, and a cooling fan motor for cooling the high-voltage battery is disposed to a rear side of the entire high-voltage battery and laterally to a side of the high-voltage battery, and on the same horizontal plane that the high-voltage battery is located on, wherein the vehicle is a fuel cell electric vehicle that mounts a fuel cell thereon, wherein a hydrogen pipe for supplying the fuel cell extends in a vehicle fore-and-aft direction, and wherein positions of the hydrogen pipe and the cooling fan motor in a vehicle-height direction are shifted from each other when viewed from the vehicle fore-and-aft direction.

* * * * *